United States Patent
Alger-Meunier et al.

(10) Patent No.: US 6,252,890 B1
(45) Date of Patent: Jun. 26, 2001

(54) APPARATUS FOR COMPENSATING FOR SIGNAL TRANSIT TIME DIFFERENCES OF DIGITAL TRANSMISSION DEVICES

(75) Inventors: Michael Alger-Meunier, Haar; Yousif Ammar, Moosach; Dieter Brueckmann, Meerbusch; Gerald Hoefer, Langerringen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/881,222

(22) Filed: Jun. 24, 1997

(30) Foreign Application Priority Data

Jun. 24, 1996 (DE) ................................. 196 25 219

(51) Int. Cl.[7] .................................................. H04M 3/18
(52) U.S. Cl. ............................................................. 370/503
(58) Field of Search .................... 370/350, 503, 370/507, 508, 516–519; 375/356, 371

(56) References Cited

U.S. PATENT DOCUMENTS

| | | | |
|---|---|---|---|
| 4,301,539 | * 11/1981 | Kage | 375/356 |
| 4,696,052 | * 9/1987 | Breeden | 455/503 |
| 4,918,746 | * 4/1990 | Serizawa | 455/524 |
| 5,293,380 | * 3/1994 | Kondo | 370/337 |
| 5,361,398 | * 11/1994 | Christian et al. | 455/503 |
| 5,363,375 | 11/1994 | Chuang et al. | |
| 5,388,102 | 2/1995 | Griffith et al. | |
| 5,561,701 | * 10/1996 | Ichikawa | 455/31.2 |
| 5,654,960 | * 8/1997 | Kohlschmidt | 370/337 |
| 5,722,081 | * 2/1998 | Tamura | 455/502 |
| 5,872,821 | * 2/1999 | Schoffel | 375/371 |
| 5,875,208 | * 2/1999 | Hoole | 375/200 |
| 5,878,032 | * 3/1999 | Mirek et al. | 370/252 |
| 5,878,034 | * 3/1999 | Hersheys et al. | 370/321 |
| 5,901,360 | * 5/1999 | Kim | 455/503 |
| 5,912,886 | * 6/1999 | Takahashi et al. | 370/350 |

* cited by examiner

Primary Examiner—Melvin Marcelo
Assistant Examiner—Jasper Kwoh
(74) Attorney, Agent, or Firm—Herbert L. Lerner; Laurence A. Greenberg; Werner H. Stemer

(57) ABSTRACT

An apparatus transmits digital signals between a higher-ranking station and one or more subordinate stations through transmission devices. A signal transit time is automatically measured in the transmission devices, differences in transit time are automatically compensated for and useful signals in the various subordinate stations are automatically synchronized with one another.

3 Claims, 1 Drawing Sheet

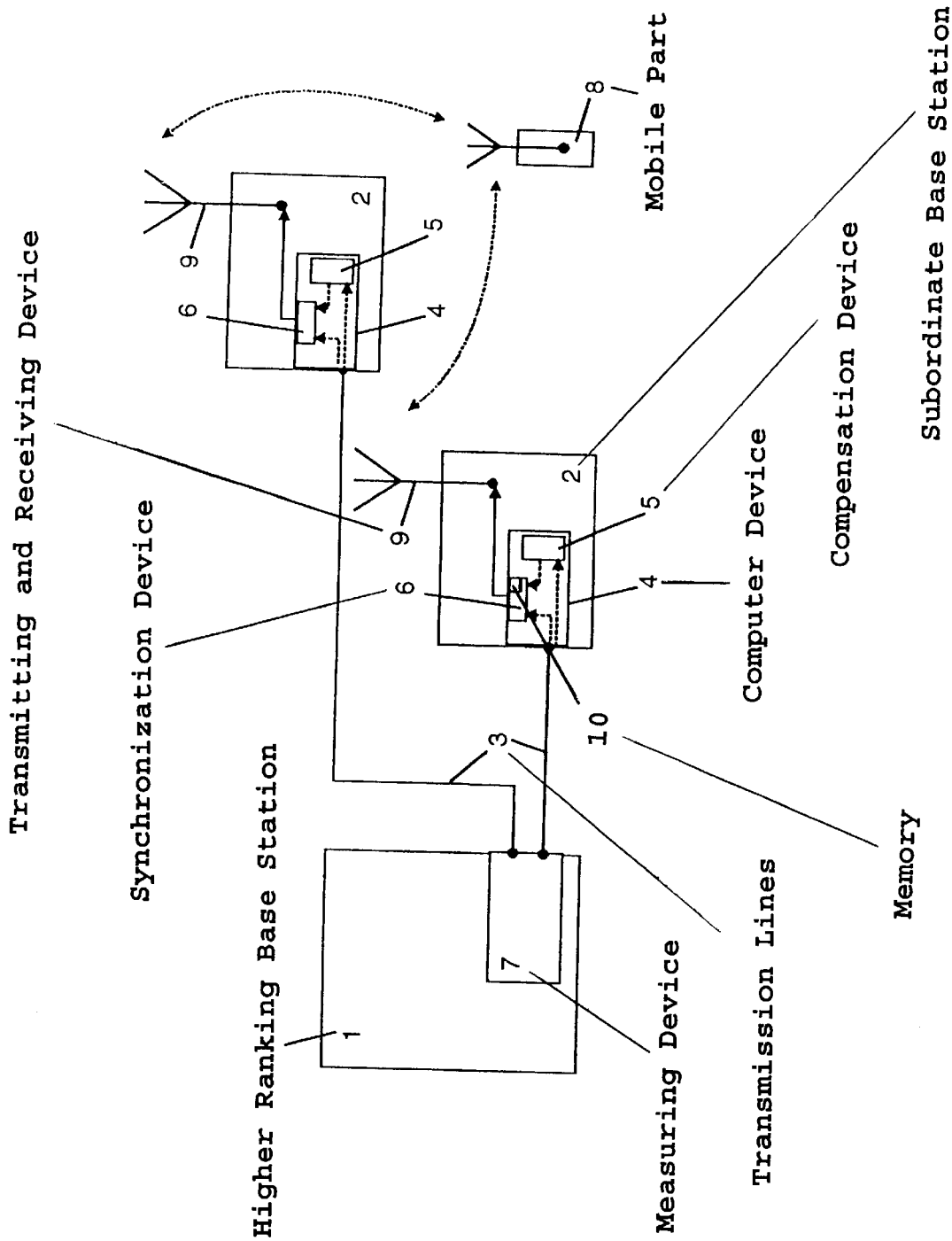

APPARATUS FOR COMPENSATING FOR SIGNAL TRANSIT TIME DIFFERENCES OF DIGITAL TRANSMISSION DEVICES

BACKGROUND OF THE INVENTION

Field of the Invention

The invention relates to an apparatus for transmitting digital signals between a higher-ranking station and one or more subordinate stations.

The signal transit times in different transmission devices are not constant. For example, where the transmission devices are wireline connections, the signal transit times are very highly dependent on the length of the transmission line. When various pieces of equipment with different lengths of transmission lines are used simultaneously, it is necessary to compensate for the different line transit times of each system. Those problems arise particularly in applications using radio-in-the-loop (RITL) and in systems with cordless telephone sets on the DECT standard. Transit time differences have been compensated for heretofore by discrete solutions.

SUMMARY OF THE INVENTION

It is accordingly an object of the invention to provide an apparatus for compensating for signal transit time differences of digital transmission devices, which overcomes the hereinafore-mentioned disadvantages of the heretofore-known devices of this general type and in which compensation for signal transit time differences in a digital transmission device disposed between a higher-ranking station and subordinate stations can be ascertained at any time and automatically from individual signal transit times of respective transmission devices.

With the foregoing and other objects in view there is provided, in accordance with the invention, a n apparatus for transmitting digital signals between higher-ranking and subordinate stations, comprising a higher-ranking station; at least one subordinate station; and transmission devices between the higher-ranking station and each of the at least one subordinate station; each of the at least one subordinate station including a transmitting and receiving device, and a computing device having a synchronizing device and a compensating device, the synchronizing device automatically synchronizing data transmission in each of the at least one subordinate station and having a memory, the compensating device automatically calculating signal transit time differences from a difference between an assumed maximum signal transit time and respective actual signal transit times in the various transmission devices and automatically inserting a delay, corresponding to the signal transit time difference, into the memory of the synchronizing device, and the transmitting device automatically delaying the signals transmitted on an output side by the delay stored in memory; and the higher-ranking station including a transmitting and receiving device, and devices for automatically measuring signal transit times in the transmission devices.

In accordance with a concomitant feature of the invention, the devices for automatically measuring the signal transit times, the devices for automatically synchronizing the data transmission, and the devices for automatically compensating for the signal transit time differences are coupled for interference-free transmission of signals between the at least one subordinate station and mobile parts.

Other features which are considered as characteristic for the invention are set forth in the appended claims.

Although the invention is illustrated and described herein as embodied in an apparatus for compensating for signal transit time differences of digital transmission devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic and block diagram of an apparatus for compensating for signal transit time differences of digital transmission devices.

DESCRIPTION OF THE PREFERRED EMBODIMENTS

Referring now in detail to the single FIGURE of the drawing, there is seen an exemplary embodiment of an apparatus having a transmission device 3, such as a telephone line, connected between a higher-ranking station or location 1, such as a telephone exchange, and one or more subordinate stations or locations 2, such as a subscriber terminal. The higher-ranking station or point 1 and the subordinate stations or points 2 contain transmission and reception devices. Moreover, the higher-ranking station 1 includes devices 7 for automatically measuring signal transit times in the transmission devices 3. Devices 6 for automatically synchronizing data transmission are provided in each of the subordinate stations 2. Moreover, a computing device 4 is provided in each subordinate station 2. This computing device 4 includes a device 5 to compensate for the transit time differences.

A transmitting and receiving station on the output side of the higher-ranking station 1 and transmitting and receiving stations on the input side of the subordinate stations 2 are connected to one another bidirectionally through the transmission devices 3. A useful signal is delivered from the transmitting and receiving devices of the subordinate stations 2 to the computing device 4, which includes the device 6 for synchronizing data transmission and the compensation device 5. The compensated and synchronized useful signal is then sent to a further transmitting and receiving device 9 at an output of a respective subordinate station 2. The useful signal is forwarded on the output side in cordless fashion, for instance by radio, from this transmitting and receiving device 9 to a mobile part 8, for instance a so-called DECT handy or cell phone.

In order to provide transit time measurement, information available in the higher-ranking station 1 regarding a phase relationship of a transmission pulse or clock rate in comparison with a reception pulse or clock rate, is evaluated. The signal transit time which is thus ascertained for the respective transmission device 3 is transmitted to the respective receiving station of the subordinate station 2, where it is encoded in accordance with the demands of the computing device. The compensation device 5 in each of the subordinate stations 2 automatically calculates the transit time differences for the respective transmission devices 3. The transit time differences are obtained from the difference between an assumed maximum signal transit time and a measured signal transit time in the respective transmission device. A delay corresponding to this difference is introduced into a memory 10 of the synchronizing device 6. The signals in the various subordinate stations 2 are synchronized with one another in the synchronizing devices. The useful signals received in the subordinate stations 2 are delayed by the delays which are stored in memory 10. In this way, the signals transmitted on the output side to the mobile parts 8 are synchronized with one another at each of the subordinate stations 2 with an accuracy of >1 µs.

This procedure requires no manual transit time measurement or discrete adjustment of the compensation values, it can be repeated at any time, and it becomes possible for the first time due to the above-described combination of the devices involved. The transit time measurement can be repeated continuously with the present invention at brief intervals (such as 50 ms). This can be ascertained, along with gradual changes in the signal transit times of the kind caused by temperature fluctuations, for instance, and rapid changes having a detection which is especially significant in cordless, mobile applications. Accordingly, the signals in the subordinate stations can be constantly resynchronized if there is any change in the transit time, through the use of a variation of the compensation values.

We claim:

1. An apparatus for transmitting digital signals between higher-ranking and subordinate base stations, comprising:

a higher-ranking base station;

at least one subordinate base station;

a transmission line between said higher-ranking base station and each of said at least one subordinate base station; and each of said at least one subordinate base station including a transmitting and receiving device for transmitting signals to said higher-ranking base station, and a computing device having a synchronizing device and a compensating device, said synchronizing device automatically synchronizing data transmission in each of said at least one subordinate base station and having a memory, said compensating device automatically calculating signal transit time differences from a difference between an assumed maximum signal transit time and respective actual signal transit times in said transmission line and automatically inserting a delay, corresponding to the signal transit time difference, into said memory of said synchronizing device, and said transmitting line automatically delaying the signals transmitted on an output side by the delay stored in memory.

2. The apparatus according to claim 1, wherein said devices for automatically measuring signal transit times, said synchronizing device and said compensating device are coupled for interference-free transmission of signals between said at least one subordinate base station and mobile parts.

3. The apparatus according to claim 1, wherein said higher-ranking base station has a measuring devices in said higher-ranking base station for automatically measuring signal transit times in said transmission line.

* * * * *